April 6, 1954 — H. RIETSCHEL — 2,674,674
SCREW-TYPE BATTERY SWITCH
Filed Aug. 28, 1952

INVENTOR.
HENRY RIETSCHEL
BY Nicholas J. Garofalo
his ATTORNEY

Patented Apr. 6, 1954

2,674,674

UNITED STATES PATENT OFFICE 2,674,674

SCREW-TYPE BATTERY SWITCH

Henry Rietschel, Elmont, N. Y.

Application August 28, 1952, Serial No. 306,884

2 Claims. (Cl. 200—158)

1

This invention relates to a new and improved type of electrical switch. It is particularly concerned with the provision of a screw-type switch useful in breaking the battery circuit in motor vehicles and the like; and it has for its general object the elimination of certain well known difficulties and annoyances commonly associated with motor vehicles wherein a battery is used as a source of power.

A feature of the switch is that it is provided with a readily removable screw for making and breaking electrical contact in the battery ground line. An advantage of this is that the ground circuit may be readily broken and the contact screw removed, thereby reasonably insuring the car in which the switch is employed against theft.

The switch is of decided advantage in eliminating fires and in preventing sounding of the horn through short circuits when a vehicle is parked and left unattended. It prevents wearing down of the battery by small children likely to play about a parked vehicle and likely to turn on the ignition or to sound the horn, and further prevents accidents by small children accidentally moving the car by turning on the starter.

A further feature of the invention is its waterproof nature making it particularly useful in the battery lines of boats where the circuit may be broken without fear of its closing again through action of the water getting between the contacts.

The invention further proposes a screw-type battery switch wherein the circuit may be readily broken and a good contact again assured through a particular arrangement of the contacts.

A further feature of the invention is the concealed nature and construction of its contacts. This feature not only avoids corrosion and attack of the contacts by water, but also provides a safety guard so that the switch may be turned off without producing external sparking of the contacts and possible explosions in those cases where gasoline fumes are present, as in the close quarters of a boat.

An object of the invention is, therefore, a screw-type battery switch that is safe, economical to manufacture and practical.

A further object of the invention is a screw-type switch having waterproofed and concealed contacts.

Another object of the invention is a theft-proof screw-type electrical switch.

A still further object of the invention is a screw-type switch for a battery that is safe in that it eliminates external sparking, that is waterproof and thereby insuring clean contacts at all times, that is burglar proof, insures a good electrical contact at all times, and which is simple to manufacture.

2

The foregoing objects and advantages of this invention, as well as others, will become readily apparent as this specification is read in conjunction with the accompanying drawings and as it proceeds in further detail.

In the drawings, which are a material part of this application:

Figure 1:
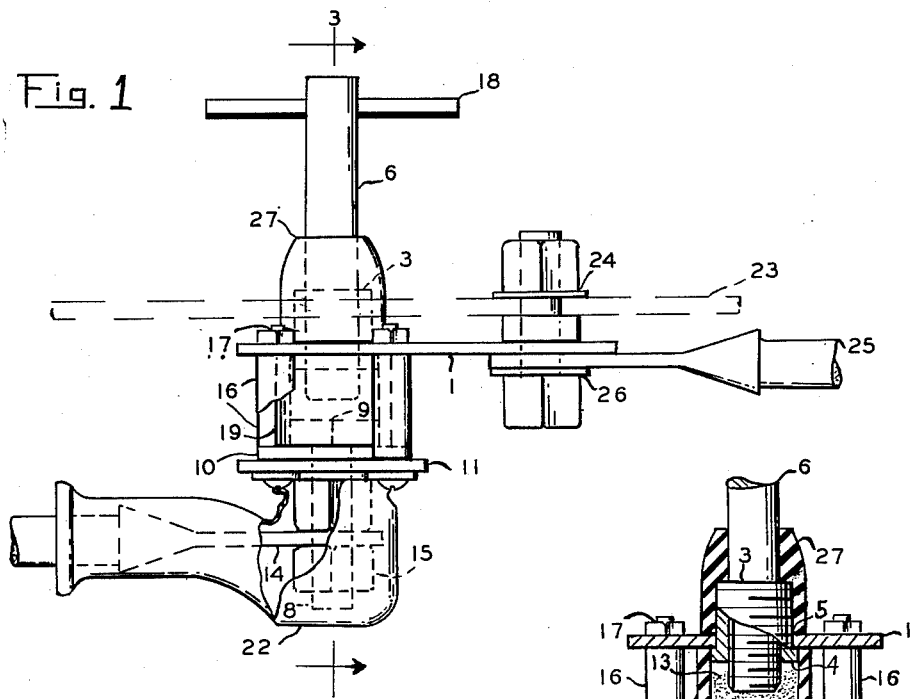
Fig. 1 is a side elevational view of a switch embodying the invention.

In describing the invention in detail reference is directed to the several drawings wherein like numerals serve to identify similar parts and, wherein there is disclosed an electrical switch including an electrically conductive metal terminal plate 1 provided with suitable means, such as an opening 2 by which the plate may be bolted to ground. Secured to plate 1 is a metal cylindrical element or bushing 3, threaded internally and externally and having a circular flange 4 at its lower end. The bushing is received through an opening 5 in the plate and is securely threaded therein to the plate. It can be appreciated that the bushing may be formed integral with the plate or secured thereto in other manner, such as by welding. An advantage of threading the bushing through the plate is one allowing for economy of manufacture not otherwise obtainable. Bushing 3 is adapted to threadably receive therethrough and to carry a metal conductive screw contact member 6. Element 6 is adapted to make and break electrical contact with a second contact element 7. Element 7 comprises a metal bolt having a threaded shank 8 and a flat head 9, and is threadedly secured to a heavy metal rectangular plate 10 in such manner that the head 9 is in contact with the inner side of the plate 10, while the shank 8 extends through and from the other side of the plate. It can readily be seen that element 7 may be formed integral with plate 10 or it may be secured thereto in other suitable manner such as by welding.

The shank portion 8 of element 7 extends through the center of an insulator plate 11, and the latter is secured thereto by nut and washer means 12. Plate 11 is rectangular in shape and of stiff fibre insulating material.

Figure 3:
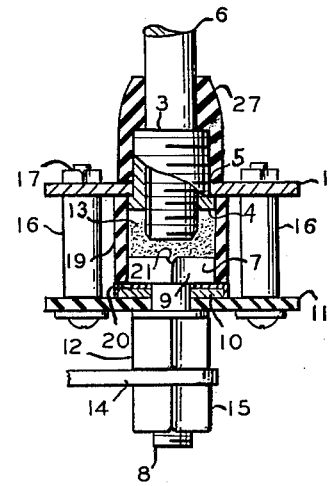
Fig. 3 is a cross section taken on the lines 3—3 of Fig. 1 with some portions omitted.
Figure 2:
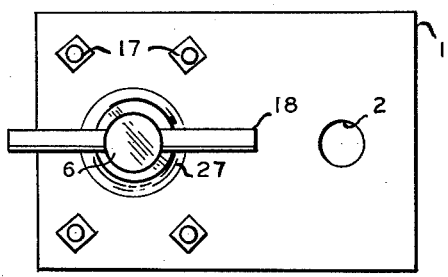
Fig. 2 is a plan view thereof with some parts omitted.

The extended end of shank 8 is adapted to receive a cable terminal 14, leading from the ground side of a battery and secured to the shank by a nut 15. The plate element 11 is suspended from plate 1 and is spaced therefrom by four vertically rigid spacers 16 of fibre insulating material. Suitable means, such as nuts and bolts 17 through the corners of plate 11, through spacers 16 and plate 1 secure these several elements fast to one another. In the fully assembled device, as shown in Figs. 1 and 3, the flat contact head 9 of element 7 is separated from the bushing 3 and plate 1 so that the battery circuit to ground is normally broken at this point. The line from battery to ground is closed by threading the screw contact element 6 through the bushing 3 until its tip makes contact with the head 9 of element 7.

Screw element 6 is provided with a handle 18, by which it may be manually gripped and threaded in or out of the bushing 3. After element 6 has made contact with the head 9 of element 7, the contact is made good and secure by giving the screw handle 18 an extra partial turn. This secure contact is enabled through the particular arrangement and coaction of the several elements of the switch. As previously described, the fibre plate 11 bridges the four rigid spacers 16 and is securely bolted thereto at its corners, and it is further provided with the weighted metal plate 10 over its center, whereby such arrangement a limited amount of resilience or give is enabled over the central area of plate 11. Now, when the screw element 6 is tightened against the contact head 9, the fibre plate 11 is forced slightly downward and caused to be tensioned against the downward pressure of the screw element, whereby the screw element and contact head are forced tight against one another, thereby affording a good electrical contact and insuring a full and proper current flow therethrough.

When the contacts are opened by turning the screw element 6 away from contact head 9, a spark may result across the contacts. This might prove dangerous and cause a fire or explosion, particularly where gas fumes are present or have accumulated, as often happens in the close quarters of small watercraft. To safeguard against this, the contact points are confined by providing a cylinder 19 of heavy rubber or other insulating material about them, which cylinder fits at its upper and lower ends tightly between the plates 1 and 10. This arrangement also serves to seal the contacts tight against water and corrosion. The plate 10 is also covered with an insulating waterproof covering 20, so as to protect it against water and corrosion.

To further insure a good contact of elements 6 and 9 with one another, the end of element 6 is slightly tapered and the head of element 7 is provided with a slot 21 across the center thereof. Due to the slight taper the element 6 tends to grip the contact head 9 and eventually to wear a pocket into it, in which it will snugly fit, while the slot 21 tends to take up possible dirt as the elements make contact.

The cavity within the cylinder about the points of contact elements 6 and 7 is loaded with grease. This makes the area about the points of contact airtight. This airtight feature of the contacts further insures against gas fumes, as mentioned, from seeping to the points of contact during the making and breaking thereof and causing an explosion from any spark that might develop. Another advantage of this airtight feature is that corrosion from condensation about the contacts is also prevented.

As a further safety measure, the terminal end of shank 8 is provided with a rubber cap 22, which covers and insulates both the terminal end of element 7 as well as the cable terminal 14. This insures against possible shorts between the terminals of the switch when one is working about this portion of the vehicle embodying the invention.

In use the device is preferably attached to the fire wall 23 of a motor vehicle, as in Fig. 1, and is secured thereto by suitable nut and bolt means 24. A cable 25 bolted to the terminal plate 1, as at 26, is grounded by a connection at its other end to the chassis of the vehicle. It can readily be seen, however, that if the fire wall 23 should afford a sufficient ground, then the cable 25 to the chassis may be dispensed with. To hold the device rigid on the fire wall 23 and to prevent it from turning, a conical rubber cap 27 is formed tight over the bushing 3. This conical member is received tightly in an opening of the fire wall and, together with the bolt and nut means 24, the device is rigidly held against the fire wall. The rubber cap 27 extends a distance beyond the bushing 3, and through the open end of the rubber cap the screw member 6 is passed and threaded into the bushing.

It is to be noted that the screw element 6 is removable from the bushing and, when the motor vehicle is parked and left unattended, the screw element may be removed entirely from the switch and carried off with the car owner. This feature serves as a protection against theft of the vehicle inasmuch as the ground line cannot readily be closed without the element 6.

While I have described and illustrated a specific embodiment of my invention, it is my intention to claim all such forms of the invention as may reasonably be construed to be within the spirit of the invention and within the scope of the appended claims.

I claim:

1. An electrical battery switch adapted to close and open the circuit to ground, comprising a pair of plates mounted one upon the other in fixed space relation to each other, one of the plates being of stiff fibre non-conductive material and having a fixed contact mounted on the inner side thereof and provided with an extension of the contact on the other side of the plate adapted for securing one end of a battery ground cable thereto, the other plate being of conductive metal having threaded open means therein and including an elongated screw contact manually threadable in said open means for engagement with the fixed contact and threadable out of said open means for separation of the contacts and for removal of the screw contact entirely from the switch, means for securing a ground line to the metal plate, a waterproof housing enclosing said contacts, and grease packed within the housing about the contacts in such manner that said contacts are sealed against contact with air.

2. An electrical battery switch adapted to close and open the circuit to ground, comprising a pair of rectangular plates, fastening means at each corner of the plates connecting the plates together one above the other and in fixed spaced relation to each other, one of the plates being of resilient fibre non-conductive material and having a fixed contact mounted on the inner side thereof, said contact having an extension to the outer side of the plate for securing one end of a battery ground cable thereto, the other plate being of conductive material having a threaded opening therein and including an elongated scerw contact manually threadable in said opening for engagement with the fixed contact and threadable out of said opening for separation of the contacts and removal of the screw contact entirely from the switch, the resilient plate providing a tension upon tightening of the contacts against one another serving to lock the contacts together, a waterproof housing enclosing the contacts, grease packed within the housing about the contacts, and means for securing a ground line to the conductive plate.

References Cited in the file of this patent

UNITED STATES PATENTS

| Number | Name | Date |
|---|---|---|
| 913,809 | Carr | Mar. 2, 1909 |
| 1,911,739 | Bangston | May 30, 1933 |
| 2,061,460 | Freysinger et al. | Nov. 17, 1936 |